United States Patent [19]
Chen et al.

[11] Patent Number: 6,020,038
[45] Date of Patent: Feb. 1, 2000

[54] FUSER MEMBER WITH VINYL AND HYDRIDE CONTAINING POLYDIMETHYLSILOXANE ADHESIVE LAYER

[75] Inventors: Jiann H. Chen, Fairport; Jerry A. Pickering, Rochester; William J. Staudenmayer, Pittsford, all of N.Y.

[73] Assignee: Eastman Kodak Company, Rochester, N.Y.

[21] Appl. No.: 08/915,348

[22] Filed: Aug. 22, 1997

[51] Int. Cl.$^7$ ..................................... B29D 22/00
[52] U.S. Cl. .................. 428/36.9; 428/35.8; 428/324; 428/332; 428/341; 428/323; 399/320; 399/330
[58] Field of Search ...................... 399/320, 330; 428/35.8, 36.9, 324, 332, 341, 323

[56] References Cited

U.S. PATENT DOCUMENTS

| | | | |
|---|---|---|---|
| 4,357,388 | 11/1982 | Minor | 428/450 |
| 5,217,837 | 6/1993 | Henry et al. | |
| 5,292,562 | 3/1994 | Fitzgerald et al. | 428/35.8 |
| 5,332,641 | 7/1994 | Finn et al. | |
| 5,480,725 | 1/1996 | Fitzgerald et al. | 428/447 |
| 5,534,347 | 7/1996 | Chen et al. | |

OTHER PUBLICATIONS

Eaborn, Organosilicon Compounds, Academic Press, N.Y., pages 2 and 3 (1960).

*Primary Examiner*—Melvyn I. Marquis
*Attorney, Agent, or Firm*—Doreen M. Wells

[57] ABSTRACT

An adhesion layer disposed in a fuser member between an underlying base cushion layer and an outer release layer comprises the reaction product of vinyl- and hydride-containing polydimethylsiloxanes.

8 Claims, No Drawings

FUSER MEMBER WITH VINYL AND HYDRIDE CONTAINING POLYDIMETHYLSILOXANE ADHESIVE LAYER

FIELD OF THE INVENTION

The present invention relates generally to multiple layered toner fusing members and, more particularly, to such members having an adhesion layer which prevents delamination of the separate layers.

BACKGROUND OF THE INVENTION

Fusing rollers currently used in fusing toners can be of multilayered construction. A two-layer fusing roller frequently comprises a cylindrical base core covered with a silicone elastomer cushion layer and coated thereon a fluoroelastomer fusing surface layer. Fluoroelastomer fusing surface layers have a propensity to interact with toners and cause premature offsets. They are used in conjunction with functional polydimethyl siloxane (PDMS) release oils and are resistant to penetration by the silicone release oils. However, due to poor adhesion of fluoroelastomer layers to silicone elastomers, the inner silicone elastomer surface must be modified before the fluoroelastomer is applied. This modification may include treatment with a primer, addition of an adhesive layer, or surface treatment including corona discharge treatment (CDT), plasma treatment or flame treatment.

U.S. Pat. No. 5,217,837 (Henry et al.) describes fusing rollers having a surface comprising fluoroelastomers such as Viton GF applied as a relatively thin layer overcoated on a relatively thicker layer of a thermally conductive high temperature vulcanized (HTV) silicone elastomer base cushion layer. Such layers are prone to failure by delamination of the fluoroelastomer from the silicone elastomer at an unpredictable period of use or time. To improve the bonding between their HTV silicone elastomer and fluoroelastomer layers and reduce the rate of failure by delamination or debonding, Henry et al. teach the combination of an amino silane primer layer and an adhesive layer. The adhesive layer is prepared by adding vinyl containing silicone coupling agents to a fluoroelastomer solution. The primer layer and the adhesive layer are interposed between a thermally conductive silicone base cushion layer and a fluoroelastomer surface layer as shown below:

| Core | HTV silicone rubber layer | Silane primer layer | Adhesive layer | Fluoroelastomer surface layer |
|------|---------------------------|---------------------|----------------|-------------------------------|
|      | vinyl containing silicone peroxide cured Al$_2$O$_3$, BN fillers | Union Carbide A1100. Amino propyl triethoxysilane | vinyl containing silane coupling agent DC3-6060 + Viton GF/15CuO | Viton GF |

U.S. Pat. No. 5,534,347 (Chen et al.) describes multilayered fusing rolls provided with an underlying silicone elastomer layer coated with a strongly adhesive fluorocarbon silicone based polymeric composition without prior CDT of the elastomer surface. However, if desired, CDT can still be performed without loss of adhesive strength. In order to achieve the desired adhesive strength, the coating composition contains a hard silicone mixture with fluorocarbon elastomer creating an interpenetrating network of the individually cured polymers. Chen's structure is represented below:

| Core | Silicone elastomer layer | IPN adhesive barrier layer | Silicone surface layer |
|------|--------------------------|----------------------------|------------------------|

U.S. Pat. No. 5,332,641 (Finn et al.) describes a fuser member having an amino silane adhesive layer between the surface of the aluminum core base member and the fluoroelastomer fusing surface. Finn's structure is represented below:

| Core | Silane coupling agent A1100 and Viton GF adhesive layer | Viton GF base coat layer | Fluoroelastomer (Viton GF) surface layer |
|------|---------------------------------------------------------|--------------------------|------------------------------------------|

There is still a need, however, for coating compositions that provide strong adhesion of the fluoroelastomer outer fusing surface layer to the silicone elastomer base cushion layer. Such compositions are needed to decrease the rate of fuser member failure due to delamination of the fluoroelastomer outer surface layer from the silicone elastomer base cushion layer.

SUMMARY OF THE INVENTION

The present invention provides an adhesion layer in a fusing member, said adhesion layer comprising a vinyl- and hydride-containing polydimethylsiloxane.

The present adhesion layer is the reaction product of polydimethylsiloxanes represented by the general formulas A and B A: 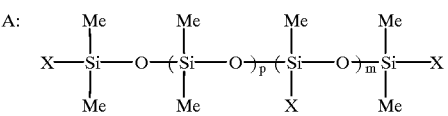

where m+p=10 to 3000; and X=vinyl or methyl, at least one of X being=vinyl;

B: 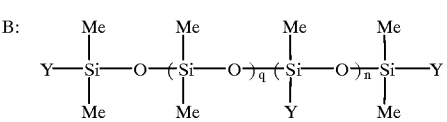

where n+q=10 to 3000; and Y=SiH or methyl, at least one of Y being=SiH; in the presence of a Pt curing catalyst in a weight ratio of $10^{-3}:1$ to $10^{-6}:1$ with respect to the total weight of A+B; provided that the ratio of vinyl- to SiH-bearing repeats or endgroups of combined A+B is from 0.5:1 to 5:1. The adhesion layer can be used in a fusing member comprising, in order, a base member; an addition cured silicone elastomer cushion layer; the vinyl- and hydride-containing silane adhesive layer of claim 1; and a fluoroelastomer fusing surface comprising poly(vinylidene fluoride-tetrafluoroethylene and hexafluoro-propylene) wherein the poly(vinylidene fluoride) is more than 50 mole %; and the poly(hexafluoropropylene) is at least 14 mole %.

According to the present invention, an adhesion layer is provided between the addition cured silicone elastomer cushion layer and the fluoroelastomer fusing surface layer. A typical fuser member of the present invention is illustrated below:

| cylindrical core base member | addition cured silicone elastomer base cushion layer | vinyl- and hydride-containing polydimethylsiloxane adhesive layer cured with Pt salt curing agent; may also contain $Cr_2O_3$, $TiO_2$ | Fluoroelastomer fusing surface may also contain $Al_2O_3$, $S_nO_2$, CuO. |
|---|---|---|---|

Thermally conductive fillers (e.g. $Al_2O_3$ or $S_nO_2$) present in the outermost fusing surface layer interact with the polymeric release agent to provide a thermally conductive fusing surface. The adhesive layer is cured with a platinum salt curing agent.

The present invention provides better adhesion between fluoroelastomer and silicone rubber layers than when CDT alone is applied. The adhesive layer of this invention adheres strongly to the fluoroelastomer layer and silicone base cushion layer without aging or degradation.

Also, the outermost fluoroelastomer interacts with the polymeric release agent and can serve as an oil barrier layer to preserve the underlying silicone elastomer layer from oil swelling.

Further, the present invention can achieve adhesion with a single layer, which is simpler than the multiple layers of the prior art (e.g. Henry et al.).

DETAILED DESCRIPTION OF THE INVENTION

A primary object of this invention is to provide an adhesive layer between an underlying addition cured silicone rubber base cushion layer and an elastomer fusing surface comprising poly(vinylidene fluoride-hexafluoropropylene-tetrafluoroethylene) wherein the vinylidene fluoride is present in the amount more than 50 mole percent.

A typical fuser member of the present invention is described as a multilayer fuser roll comprising, in sequential order, a base support member, a relatively thick addition cured silicone elastomer layer, a strongly adhesive vinyl- and hydride-containing polydimethylsiloxane primary layer, a fluoroelastomer surface layer which may also contain a thermally conductive material such as metal oxides (e.g. $Al_2O_3$, CuO or SnO2). The adhesion layer is between 2.5 and 25 microns thick. The base support member, which is typically a hollow Al or steel cylinder core, is coated with a conventional silicone primary agent (DC-1200). The primed core is dried and injection molded or broad coated with a layer of addition cured poly(dimethyl siloxane) (PDMS) silicone elastomer. A preferred commercially available material for forming the highly cross-linked base cushion layer is Silastic J™ or Silastic E™ silicone rubber available from Dow Corning Corp.

According to the present invention, the adhesive layer which will bond the base cushion silicone elastomer layer and fluoroelastomer surface fusing layer is the reaction product of polydimethylsiloxanes represented by the general formulas A and B

A:

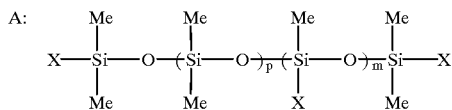

where m+p=10 to 3000; and X=vinyl or methyl, at least one of X being=vinyl;

B:

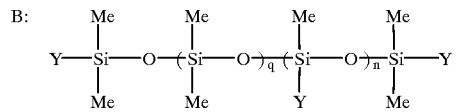

where n+q=10 to 3000; and Y=SiH or methyl, at least one of Y being=SiH; in the presence of a Pt curing catalyst in a weight ratio of $10^{-3}$:1 to $10^{-6}$:1 with respect to the total weight of A+B; provided that the ratio of vinyl- to SiH-bearing repeats or endgroups in combined A+B is from 0.5:1 to 5:1.

According to the present invention, the adhesive layer which comprises a vinyl- and hydride-functional poly (dimethyl siloxane) silicone rubber priming agent is sprayed or ring-coated on top of the addition cured PDMS base cushion layer. The coating is air dried and then cured using a one hour ramp to 60° C. and maintaining at 60° C. for two hours. In a preferred embodiment, metal oxide (such as $Cr_2O_3$, $TiO_2$) are dispersed in the adhesion layer which is capable of interacting with the base cushion layer and the top surface releasing layer. In addition, a small amount of Pt curing catalyst is incorporated into the adhesion layer to promote the interaction between the base cushion layer and the top surface release layer. The amount of Pt catalyst is between $10^{-3}$ to $10^{-6}$ weight per cent and preferably $10^{-4}$ to $10^{-6}$ weight per cent with respect to the polymeric content (i.e. polymers A and B) of the adhesion layer.

The outermost surface layer of the multilayer fuser member of this invention comprises a cured fluoroelastomer, preferably a terpolymer of vinyli-dene fluoride ($VF_2$), tetrafluoroethoxy (TFE), and hexafluoropropylene (HEP). The vinylidene fluoride is present in an amount more than 50 mole percent and the HFP is present at least 14 mole %, preferably, at least 21 mole %.

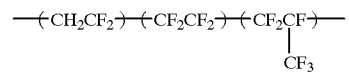

| | | | | |
|---|---|---|---|---|
| FE58400 | 53 mole % | 26 mole % | 21 mole % | $VF_2$/HFP – 1.06 |
| FX9038 | 52 mole % | 34 mole % | 14 mole % | $VF_2$/HFP = 1.58 |

A preferred fluoroelastomer for the outermost layer of the fuser member of this invention is Fluorel™ FX-9038, available from 3M, containing 52 mole % $VF_2$, 34 mole % TFE, and 14 mole % HFP. More preferred is Fluorel™ FE5840Q, also available from 3M, containing 53 mole % $VF_2$, 26% TFE and 21 mole % HFP. At least 10 parts of metal oxide per 100 parts of cured fluoro-elastomer are included in the outermost layer of the toner fuser member. The metal oxide may be cupric oxide, plumbous oxide, or a mixture thereof.

In a preferred embodiment, 10 to 50 parts CuO are included in the outermost layer. Alumina may also be included as a thermally conductive filler in the layer. The fluoroelastomer FE5840Q is compounded through a conventional water-cooled two-roll mill with three parts MgO and 6 parts $Ca(OH)_2$ as curing agents, a bisphenol AF cross-linking agent and an organophosphonium salt accelerator are used in combination with cupric oxide and aluminum oxide. The fluoroelastomer dispersion is prepared by dispersing pre-milled FE5840Q with stirring for at least three hours in 85:15 methy ethyl ketone (MEK)/MeOH solution to give a 20- to 25 wt % solution. The solution is then ring coated on top of the adhesive layer and, after air drying, the fluoroelastomer outermost layer is cured by 24 ramp to 260° C. and kept for 24 hours at 260° C.

EXAMPLE 1

A cylindrical aluminum core was cleaned with dichloromethane and dried. The core was primed with a uniform coat of Dow 1200™ prime coat primer marketed by Dow Corning Corporation of Midland, Mich. and air dried. A base cushion comprising Silastic-J™ (Sil-J) room temperature vulcanizing (RTV) silicone rubber, marketed by Dow Corning Corporation of Midland, Mich., and catalyst was injection molded onto the core, and cured at 232° C. for two hours under 75 tons/inch$^2$ of pressure. The roller was removed from the mold and post-cured in a convection oven. The conditions for the post-cure were a 24 hours ramp to 232° C. and 24 hours at 232° C. After air cooling the roller, a dispersion was prepared from 100 parts by weight Sil-J RTV silicone rubber and a total of 100 parts of a dispersing liquid comprising 85 parts MEK and 15 parts methyl isobutyl ketone (MIBK). To this dispersion was added 20 parts curing catalyst (a base:curing agent ratio of 5:1 compared to 10:1 per the manufacturer's instructions). This vinyl- and hydride-containing dispersion was coated on the cured Sil-J base cushion layer to form an adhesive layer. This adhesive layer coating was air dried and then a corona discharge treatment (CDT) applied for 1½ minutes at 400 watts. A fluorocarbon elastomer layer consisting of FE5840Q Fluorel™, 35 vol % T-64 ($Al_2O_3$) and 10 pph of CuO was prepared as a 40% weight percent solids solution in 85/15% mixture of MEK/MeOH. The resulting material was ring coated onto the adhesive layer, air dried and baked by ramping to 260° C. over 24 hours and maintaining 260° C. for 24 hours. The resulting fluorocarbon elastomer had a thickness of 1 mil, the Sil-J base cushion layer a thickness of 380 mil and the adhesive layer about ½ mil. The cured roller was separated from the core and cut into strips (6.35 mm in width) for peel-testing. The roller had excellent adhesion between the layers. An Instron peel test was performed using a peel rate of 1 cm/min. The fluorocarbon elastomer-adhesive layer was peeled at an 180° peel angle from the cushion by moving the upper clamp assembly and holding the Sil-J silicone rubber cushion stationary in the lower clamp. The peel force was measured and is recorded in Table 1.

EXAMPLE 2

Example 2 followed the same procedure as example 1 except the Sil-J base cushion was not post-cured after the injection mold, but co-cured with the adhesive layer and fluorocarbon elastomer layer.

EXAMPLE 3,4

Examples 3 and 4 followed essentially the same procedure as described for example 1, except that the Sil-J base cushion had a ground surface on which an additional CDT treatment was applied before applying the adhesive layer.

EXAMPLE 5

Example 5 followed essentially the same procedure as described for example 1, except that no CDT was applied to the adhesive layer before ring-coating the fluorocarbon elastomer solution.

EXAMPLE 6,7

Examples 6 and 7 followed essentially the same as procedure described for example 1 except that the Sil-J base cushion had a ground surface. After preparation the multi-layered rollers were placed in a working copier test machine for life testing. There was no delamination of the fluoroelastomer layer and testing was suspended after 175K toned test copies. A second roll demonstrated no delamination after 300K toned test copies after which the test was stopped. Both rolls demonstrated no reduction in the adhesive bond as demonstrated by the peel force results.

COMPARATIVE EXAMPLES C-8 to C-14

In comparative examples C-8 through C-14 (Table 2) the base cushion preparation was essentially the same as in example 1 except that no Sil-J adhesive layer was applied and various other adhesive systems were tried.

COMPARATIVE EXAMPLES C-8, C-9

Examples C-8 and C-9 followed essentially the same procedure as described for example 3, except that in place of the adhesive layer a silicone-fluoroelastomer interpenetrating network (IPN) was applied (Viton A and 50 pph DC6-2230™ per U.S. Pat. No. 5,534,347 (Chen et al.)) as a 25 wt % dispersion in MEK. The IPN was cured using a 2.5 hour ramp to 260° C. and 18 hours at 260° C. The fluoroelastomer was applied after a CDT treatment applied to the IPN layer. After preparation roll C-9 was placed in a working copier test machine for life testing. The roll failed from delamination of the fluoroelastomer layer and testing was suspended after 204K toned test copies.

COMPARATIVE EXAMPLES C-10 & -11

Example C-10 & -11 followed essentially the same procedure as described for example 1, except that in place of the adhesive layer an amino functional silane primer was used. A0700, available from United Chemical Technologies, Inc., was applied to the base cushion (0.5 g water, 0.5 g A0700, add to 23 g MEK after 20 min) and allowed to air dry before curing at 110° C. for 30 min. One roll had a CDT treatment applied prior to the application of the fluoroelastomer layer, while a second roll was directly coated with the fluoroelastomer layer with-out a CDT treatment.

COMPARATIVE EXAMPLES C-12

Example C-12 followed essentially the same procedure as described for example 1, except that in place of the adhesive layer an epoxy primer Chemlok 5151™ available from Lord Corporation Elastomer Products, Erie Pa., (1 part Chemlok 5151™ to 2.5 parts MEK) was applied to the base cushion. The fluoroelastomer layer was then applied without any prior CDT treatment.

COMPARATIVE EXAMPLES C-13 & -14

Example C-13 & -14 followed essentially the same procedure as described for example 1, except that in place of the adhesive layer a highly filled condensation cure silicone elastomer EC4952 supplied by Emerson Cummings, Inc. was applied and cured. EC-4952 is characterized as a silanol-terminated polydimethylsiloxane having about 85 mole percent of difunctional dimethylsiloxane repeating units, about 15 mole percent of trifunctional methylsiloxane repeating units, and a number average molecular weight of about 21,000. EC4952 has incorporated into its formulation aluminum oxide and iron oxide fillers. The filled silicone layer was ground and a CDT treatment applied prior to the application of the fluoroelastomer layer. After preparation the multilayered roller was placed in a working copier test machine for life testing. The roll failed from delamination of the fluoroelastomer layer and testing was suspended after 135K toned test copies.

The roll showed significant reduction of the adhesive bond inside the paper path.

TABLE 1

| Description of Layers | Peel Force (grams) |
|---|---|
| Ex. 1 SilJ$^{(S)}$/Ringcoat Adhesive Layer/CDT/Fluoro layer | 76 |
| Ex. 2 SilJ$^{(S)}$(no post-cured)/Ringcoat Adhesive Layer/CDT/Fluoro layer | 73 |
| Ex. 3 SilJ$^{(G)}$/CDT/Ringcoat Adhesive Layer/CDT/Fluoro layer | 67.4 |
| Ex. 4 SilJ$^{(G)}$/CDT/Ringcoat Adhesive Layer/CDT/Fluoro layer | 63.9 |
| Ex. 5 SilJ$^{(G)}$/Ringcoat Adhesive Layer/Fluoro layer | 48 |
| Ex. 6 SilJ$^{(G)}$/Ringcoat Adhesive Layer/CDT/Fluoro layer | 70.2 |
| Ex. 7 SilJ$^{(G)}$/Ringcoat Adhesive Layer/CDT/Fluoro layer | 70.8 |

$^{(S)}$= smooth base cushion
$^{(G)}$= ground base cushion
SilJ= Silastic-J ™

TABLE 2

| Description of Layers | Peel Force (grams) |
|---|---|
| C-8 SilJ$^{(S)}$/CDT/IPN/CDT/Fluoro layer | 28.5 |
| C-9 SilJ$^{(S)}$/CDT/IPN/CDT/Fluoro layer | * |
| C-10 SilJ$^{(S)}$/AO700/CDT/Fluoro layer | 14 |
| C-11 SilJ$^{(S)}$/AO700/Fluoro layer | 8 |
| C-12 SilJ$^{(S)}$/Epoxy primer/Fluoro layer | 14 |
| C-13 SilJ/EC-4952$^{(G)}$/CDT/Fluoro layer | 29 |
| C-14 - inside the paper path | 17 |

$^{(S)}$= smooth base cushion
$^{(G)}$= ground base cushion
SilJ= Silastic-J ™
*= delaminated during lab test The adhesive layer of this invention adheres strongly, without delamination, to an underlying silicone elastomer layer and the outermost fluoroelastomer surface layer. Peel strength tests were performed on several of the fusing rolls to verify the improvement in adhesion to the underlying layer. All of the rollers (including two life test rolls which were tested in a fuser assembly for 300K copies) showed no sign of delamination when the peel strength tests were performed. The results of peel tests (see attached data) showed that rollers prepared in accordance with the present invention exhibited strong adhesion.

The invention has been described in detail with particular reference to certain preferred embodiments thereof, but it will be understood that variations and modifications can be effected within the spirit and scope of the invention.

What is claimed is:

1. An adhesion layer disposed in a fuser member between an underlying base cushion layer and an outer release layer, said adhesion layer comprising the reaction product of vinyl- and hydride-containing polydimethylsiloxanes.

2. The adhesion layer of claim 1 further comprising a thermally conductive filler.

3. The adhesion layer of claim 2 wherein the thermally conductive filler is a metal oxide.

4. The adhesion layer of claim 3 wherein the metal oxide is selected from titanium oxide and chromium oxide.

5. The adhesion layer of claim 1 comprising the reaction product of polydimethylsiloxanes represented by the general formulas A and B A: 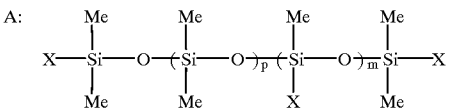

where m+p=10 to 3000; and X=vinyl or methyl, at least one of X being=vinyl;

B: 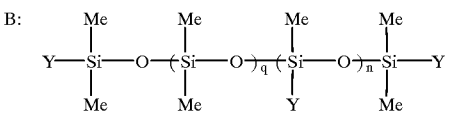

where n+q=10 to 3000; and Y=SiH or methyl, at least one of Y being=SiH;

in the presence of a Pt curing catalyst in a weight ratio of $10^{-3}$:1 to $10^{-6}$:1 with respect to the total weight of A+B;

provided that the ratio of vinyl- to SiH-bearing repeats or endgroups of combined A+B is from 0.5:1 to 5:1.

6. An adhesion layer disposed in a fuser member between an underlying base cushion layer and a surface releasing layer, said adhesion layer comprising the reaction product of vinyl- and hydride-containing polydimethylsiloxanes and further comprising a thermally conductive metal oxide filler selected from the group consisting of titanium oxide and chromium oxide.

7. The adhesion layer of claim 1 disposed in said fuser member between an underlying base cushion layer comprising a silicone elastomer and a surface releasing layer comprising a fluoroelastomer.

8. The adhesion layer of claim 1 having a thickness of between 2.5 microns and 25 microns.

* * * * *